United States Patent [19]

Stephens, Jr. et al.

[11] 4,396,423
[45] Aug. 2, 1983

[54] PROCESS FOR RECOVERING IRON AND ZINC FROM STEEL MAKING DUSTS

[76] Inventors: Frank M. Stephens, Jr., 12225 W. 18th Dr., Lakewood, Colo. 80215; James C. Blair, 3255 Moore Ct., Wheat Ridge, Colo. 80033

[21] Appl. No.: 275,799

[22] Filed: Jun. 22, 1981

[51] Int. Cl.³ .................. C22B 19/30; C21B 15/00
[52] U.S. Cl. ................................. 75/25; 75/26; 75/88; 75/69; 75/71; 75/77; 75/85; 75/11; 423/148
[58] Field of Search ............... 75/25, 26, 21, 88, 69, 75/71, 85, 11; 423/107, 148, 138

[56] References Cited

U.S. PATENT DOCUMENTS

| | | | |
|---|---|---|---|
| 1,780,323 | 11/1930 | Waring | 423/105 |
| 1,879,834 | 9/1932 | Waring | 75/109 |
| 2,774,662 | 12/1956 | Graham et al. | 75/26 |
| 3,262,771 | 7/1966 | Ban | 75/11 |
| 3,754,890 | 8/1973 | Fitch | 75/3 |
| 3,756,804 | 9/1973 | Stevenson | 75/25 |
| 3,770,416 | 11/1973 | Goskel | 75/25 |
| 3,785,802 | 1/1974 | Roberti et al. | 75/26 |
| 3,849,121 | 11/1974 | Burrows | 75/103 |
| 3,896,211 | 7/1975 | Mayor et al. | 423/138 |
| 3,999,981 | 12/1976 | Brandstatter | 75/84 |
| 4,053,301 | 10/1977 | Stephens, Jr. | 75/11 |
| 4,071,357 | 1/1978 | Peters | 75/103 |
| 4,256,496 | 3/1981 | Brandstatter | 106/43 |

FOREIGN PATENT DOCUMENTS 2212351 3/1974 Fed. Rep. of Germany .

Primary Examiner—L. Dewayne Rutledge
Assistant Examiner—Christopher W. Brody

[57] ABSTRACT

The object of the invention is to provide a process for the recovery of iron and zinc from steel making flue dust.

The process comprises subjecting the flue dust to a carbiding step in a fluid bed in the presence of a reducing agent and a carbon supplying agent to break down the zinc ferrite structure and convert the iron to iron carbide, followed by heating the residue or product of the carbiding step to recover zinc by evaporation.

The iron carbide produced may be introduced into a steel making furnace for the production of steel.

An alternative procedure is the recovery of iron carbide and zinc by magnetic separation from the gangue after the carbiding step and before separation of zinc from iron carbide.

20 Claims, 1 Drawing Figure

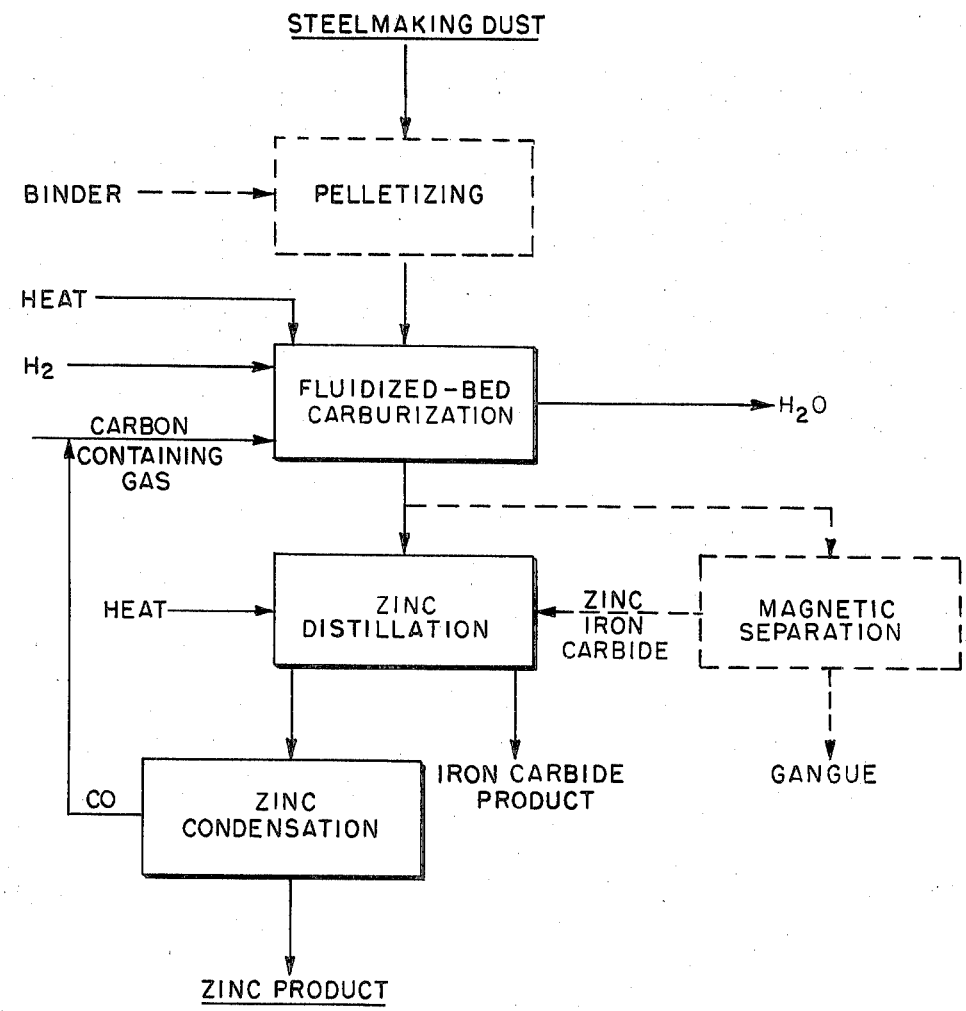

PROCESS FOR RECOVERING IRON AND ZINC FROM STEEL MAKING DUSTS

DESCRIPTION

1. Technical Field

The invention relates to the metallurgy of iron and zinc and particularly to the recovery of these metals from flue dust from furnaces used in the steel making industry.

The problem of economically recovering valuable metals, such as, iron and zinc from steel making flue dusts has received attention for some time in the industry. Part of the problem stems from the difficulty of separating these metals from each other because much of the zinc is combined with the iron as zinc ferrite. It is desirable to recover the iron in a condition which permits its use in steel making furnaces without further refining.

2. Background Art

U.S. Pat. Nos. 1,780,323; 1,879,834; 3,849,121; and 4,071,357 as well as German Pat. No. 2,212,351 (C1-C22b) 3/21/74 all relate to the recovery of zinc from flue dust and similar materials. All of the disclosed processes are hydrometallurgical processes typically including a leaching step with ammonium carbonate. Most of these patents are directed towards the recovery of zinc and other nonferrous metals and do not recover the iron in a form suitable for reuse in steel making. Complete recovery of zinc is not obtained. None of the patents disclose a process for disrupting a zinc ferrite structure and recovering zinc and iron therefrom.

DISCLOSURE OF INVENTION

In accordance with the present invention the flue dust containing iron and zinc, including zinc ferrite, is subjected to a carbiding step in a fluid bed in the presence of a reducing agent and a carbon supplying agent to disrupt the zinc ferrite structure, and convert the iron to iron carbide in accordance with the teaching of U.S. Pat. No. 4,053,301, followed by recovering the zinc by distillation after the carbiding step. The remaining iron carbide is in a condition without further refining for introduction into a steel making furnace to produce steel in accordance with the process of U.S. Pat. No. 4,053,301.

The process has the advantage that large recoveries of relatively pure zinc are made and the iron carbide produced is suitable for use in steel making furnaces. Further, it eliminates the problem of disposing of zinc ferrite in a manner to comply with environmental regulations.

BRIEF DESCRIPTION OF THE DRAWING

The single drawing is a flowsheet of the process of the invention.

BEST MODE OF CARRYING OUT THE INVENTION

The term "flue dust" as used herein includes materials containing iron and other metals which are readily separated from iron carbide, such as, zinc, lead, cadmium and others normally associated with flue dust from steel making.

Because of the fine particle size of the steel making flue dust, it is preferable to pelletize the starting material before the carbiding step, although this is not required.

The disclosure of U.S. Pat. No. 4,053,301 is incorporated herein by reference, including both the carbiding and steel making steps of the patent. This includes the carbiding temperatures, reducing and carbiding materials, ratios of additives, as well as the conditions and features associated with the steel making step.

In the examples which follow the flue dust feed material was first pelletized for the carbiding step into one-eighth inch diameter miniballs on a 24-inch laboratory balling disc using conventional binders, such as bentonite and one percent dextrose, followed by oven drying at 230° F. The invention is not restricted to the pelletizing step.

EXAMPLE 1

The feed material of typical BOF dust had the following chemical analysis:

| Material | Percent |
|---|---|
| Fe | 56.7 |
| Zn | 4.78 |
| $SiO_2$ | 2.47 |
| $Al_2O_3$ | 0.8 |
| C | 0.14 |

The oven-dried pellets were transferred to a 4-inch diameter fluidized-bed reactor where the iron-bearing materials were converted to iron carbide using a temperature of 1120° F. and a balanced mixture of carbon monoxide, carbon dioxides, water vapor and methane as a fluidizing gas. After eight hours of treatment, the reactor was cooled off and the treated product discharged.

Although there was some degradation of the pellets, in general the product remained as pelletized material. This product had the following analysis:

| Material | Percent |
|---|---|
| Fe | 64 |
| Zn | 5.76 |
| C | 5.11 |

The product or residue from the carbide conversion step was placed on a tube furnace using a nitrogen sweep gas to provide an inert atmosphere. The furnace temperature was raised to 1800° F. and held for 120 minutes during which time the zinc was vaporized as metallic zinc which condenses at the cold end of the furnace combustion tube.

After cooling, the residue was removed from the furnace and analyzed. This material had the following composition:

| Material | Percent |
|---|---|
| Fe | 73 |
| Zn | 0.13 |
| C | 3.0 |

A magnetic separation test was run on a portion of the fluidized-bed carbide product or residue to determine the feasibility of this method of separation of zinc and iron carbide from the gangue. The following results were obtained:

|  | Wt % | Fe % | Zn % | Distribution Fe % | Zn % |
|---|---|---|---|---|---|
| Magnetic Fraction | 80.2 | 72.2 | 4.5 | 89.5 | 73 |
| Nonmagnetic Fraction | 19.8 | 34.2 | 6.8 | 10.5 | 27 |
| Calculated Head |  | 64.7 | 5.0 |  |  |

Processing of the magnetic concentrate from this test through the zinc distillation step produces a final iron product assaying over 80 percent iron and less than 0.1 percent zinc. Such material is suitable for use as feed to a steel making furnace in accordance with the procedure of U.S. Pat. No. 4,053,301.

EXAMPLE 2

A second feed material of BOF dust had the following chemical analysis:

| Material | Percent |
|---|---|
| Fe | 54.4 |
| Zn | 6.5 |
| $SiO_2$ | 1.2 |
| C | 0.3 |

The material was pelletized and carbided following the procedures of Example 1, the carbided product having the following chemical analysis:

| Material | Percent |
|---|---|
| Fe | 66.8 |
| Zn | 8.06 |
| $SiO_2$ | 1.58 |
| Ca | 4.86 |
| Mg | 1.30 |
| C | 5.8 |

Recovery of zinc using the procedure of Example 1 resulted in a product or residue having the following composition:

| Material | Percent |
|---|---|
| Fe | 82.5 |
| Zn | 0.07 |
| $SiO_2$ | 2.20 |
| Ca | 5.45 |
| Mg | 1.55 |
| C | 2.1 |

The product was suitable feed material for making steel as disclosed in U.S. Pat. No. 4,053,301.

EXAMPLE 3

The feed material produced by roasting a high iron-zinc ore had the following composition. The high temperature roasting step had converted part of the zinc and iron to zinc ferrite.

| Material | Percent |
|---|---|
| Fe | 26.4 |
| Zn | 23.2 |
| $SiO_2$ | 5.2 |
| C | 0.8 |
| Mg | 1.8 |
| Ca | 2.2 |
| Al | 0.3 |
| S | 0.16 |

The material was carbided and dezinced as in Example 1, the results being summarized in the following table.

|  | % Fe | % Zn | % $SiO_2$ | % Pb | % C |
|---|---|---|---|---|---|
| Head Sample | 26.4 | 23.3 | 5.2 | 5.5 | 0.8 |
| Carbide Product | 32.9 | 25.3 | 6.22 | 4.5 | 1.9 |
| Dezinced Product | 54.7 | 0.34 | 12.2 | 0.07 | 0.8 |

After removal of the gangue constituents, the final dezinced product was suitable as a steel making feed for the process of U.S. Pat. No. 4,053,301.

EXAMPLE 4

Comparative tests were made for zinc extraction on the same feed material using the present process and a conventional ammonium carbonate leach zinc recovery process.

For one test, the carbiding and dezincing steps of Example 1 were used for applying the present process to the feed material.

The conditions for the ammonium carbonate leach comparative test were as follows:

Feed: 50 grams
Leach Solution: 192 ml. (90 2/3$NH_3$; 80 3/2 $CO_2$)
% Solids: 20%
Time: 3 hours
Temperature: Ambient The comparative results obtained are summarized in the following table.

|  | Feed G | % Zn | Residue g | % Zn | Filtrate | % Zn Extracted |
|---|---|---|---|---|---|---|
| 1. Present Process | 50.0 | 55.5 | 30.2 | 35.2 | Yellow & Opaque | 61.7 |
| 2. Head | 50.0 | 42.2 | 48.5 | 40.8 | Clear & Colorless | 6.2 |

From the results of Example 4 it is obvious that the carbiding step had altered the zinc ferrite to make the zinc available to other recovery processes, such as ammonia leaching.

The process is not limited to the recovery of zinc from zinc ferrite, but includes the recovery of zinc and other metals melting above 750° C. which accompany iron in ores and other materials. Other metals than zinc occurring with iron which are recoverable by the process are antimony, cadmium, lead and tin. These metals are all recoverable from the iron carbide residue by distillation.

We claim:

1. A process for the recovery of zinc and iron carbide from a material containing zinc and iron which comprises:
    (a) first subjecting the material to a carbiding step to convert a major portion of the iron to iron carbide, and (b) subsequently recovering zinc from the product of step (a) leaving a residue containing substantially all the iron carbide.

2. The process of claim 1 in which in step (a) the carbiding step is performed in a fluid bed in the presence of a reducing agent and a carbon supplying agent to convert the iron to iron carbide.

3. The process of claim 1 in which steel is made from the dezinced iron carbide produced in claim 1.

4. The process of claim 1 in which the mixture is flue dust.

5. The process of claim 1 in which in step (a) iron carbide and zinc are separated from the gangue of the product by magnetic separation prior to recovery of zinc in step (b).

6. The process of claim 1 in which in step (b) zinc is recovered by distillation.

7. The process of claim 2 in which the iron is converted to iron carbide in a fluidized bed with a mixture of hydrogren and a carbon containing material which provides carbon for the iron carbide.

8. The process of claim 7 in which the carbon containing material is carbon monoxide and hydrogen is present in an amount over 60% by volume of the carbon monoxide present.

9. The process of claim 7 in which the ratio of hydrogen to formed water in the reaction medium of the fluidized bed is maintained from about 2.5 to 1 to about 8 to 1 and the ratio of $CO/CO_2$ is maintained from about 1 to 1 to about 4 to 1, the prescribed $CO/CO_2$-hydrogen/$H_2O$ rations being essentially in equilibrium with methane.

10. The process of claim 7 in which the carbon containing material is solid carbon.

11. The process of claim 7 in which the carbon containing material is a lower alkyl hydrocarbon gas.

12. The process of claim 11 in which the gas is propane.

13. The process of claim 7 in which the temperature of the mixture is between about 1100° F. and about 1300° F.

14. A process for the recovery of iron and zinc from flue dust which comprises:
(a) subjecting the flue dust to a carbidizing step in a fluidized bed in the presence of a reducing agent and a carbon supplying agent to convert a major portion of the iron to iron carbide;
(b) heating the carbidized mixture of step (a) to recover the zinc by vaporization; and
(c) making steel from the product resulting from step (b).

15. A process for the recovery of iron carbide and a metal having a vaporization point above about 1300° F. from a mixture of iron and the metal which comprises:
(a) subjecting the mixture to a carbidizing step to convert a major portion of the iron in the mixture to iron carbide; and
(b) recovering iron carbide and said metal from the product of step (a).

16. The process of claim 15 in which said metal is a member selected from the group consisting of antimony, cadmium, lead, tin and zinc.

17. The process of claim 16 in which said metal is zinc.

18. A process for the recovery of iron and zinc from zinc ferrite, the recovered iron being suitable for making steel without further refining, the process comprising:
(a) breaking down the ferrite structure and converting the iron to iron carbide by heating the ferrite in a fluidized bed in the presence of a reducing agent and a carbon supplying material to a temperature not in excess of about 750° C., and
(b) separating zinc from the residue of step (a) by distillation to leave an iron carbide product which is suitable for making steel without refining.

19. The process of claim 18 in which the zinc ferrite is contained in flue dust.

20. A process for the recovery of zinc and iron carbide from a material containing zinc and iron which comprises:
(a) subjecting the mixture to a carbiding step to convert the iron to iron carbide;
(b) separating the iron carbide and zinc from the gangue of the product by magnetic separation; and
(c) recovering zinc from the product of step (b).

* * * * *